United States Patent
Fujimoto et al.

(10) Patent No.: US 11,491,666 B2
(45) Date of Patent: Nov. 8, 2022

(54) CONTROL SYSTEM, CONTROL METHOD, AND CONTROL PROGRAM

(71) Applicants: Hiroshi Fujimoto, Tokyo (JP); Akiyuki Hasegawa, Tokyo (JP); Taro Takahashi, Toyota (JP)

(72) Inventors: Hiroshi Fujimoto, Tokyo (JP); Akiyuki Hasegawa, Tokyo (JP); Taro Takahashi, Toyota (JP)

(73) Assignees: THE UNIVERSITY OF TOKYO, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 593 days.

(21) Appl. No.: 16/656,102

(22) Filed: Oct. 17, 2019

(65) Prior Publication Data
US 2020/0122318 A1 Apr. 23, 2020

(30) Foreign Application Priority Data
Oct. 19, 2018 (JP) .............................. JP2018-197807

(51) Int. Cl.
*B25J 19/02* (2006.01)
*G05B 19/042* (2006.01)
(Continued)

(52) U.S. Cl.
CPC ............. *B25J 19/02* (2013.01); *B25J 9/1633* (2013.01); *G05B 19/042* (2013.01); *G05B 2219/39355* (2013.01); *H02P 6/16* (2013.01)

(58) Field of Classification Search
CPC ......... G05B 2219/39355; G05B 19/042; B25J 19/02; B25J 9/1633; B25J 9/1602; B25J 9/1694; H02P 6/16
See application file for complete search history.

(56) References Cited

U.S. PATENT DOCUMENTS

2009/0272585 A1* 11/2009 Nagasaka .............. B25J 9/1633
74/490.03
2013/0057191 A1* 3/2013 Yoshiura ................ G05B 19/19
318/600

(Continued)

FOREIGN PATENT DOCUMENTS

EP 676681 A2 * 10/1995 ............. G05D 19/02

OTHER PUBLICATIONS

Dr. Chowarit Mitsantisuk et al, "Design for Sensorless Force Control of Flexible Robot by Using Resonance Ratio Control Based on Coefficient Diagram Method", Journal for Control, Measurement, Electronics, Computing and Communications, Automatika, 54:1, p. 62-73, 2013.

*Primary Examiner* — Bickey Dhakal
(74) *Attorney, Agent, or Firm* — Dinsmore & Shohl LLP

(57) ABSTRACT

A control system according to an embodiment includes a motor configured to drive a link, a first sensor configured to detect information about the driving by the motor or information about a relation between the driving means and the load member as first sensor information, a second sensor configured to detect information about a displacement of the link as second sensor information, and a control unit configured to perform feedback control of the driving means so as to follow a command value in a two-inertial system model including an inertial system on a load side and an inertial system on a driving side. The control unit includes a disturbance observer configured to estimate a disturbance, and a filter configured to convert an estimated value of the disturbance into a driving force of the motor.

5 Claims, 3 Drawing Sheets

(51) Int. Cl.
*B25J 9/16* (2006.01)
*H02P 6/16* (2016.01)

(56) References Cited

U.S. PATENT DOCUMENTS

| | | | | |
|---|---|---|---|---|
| 2014/0176036 A1* | 6/2014 | Hagihara | ................ | H02P 23/12 |
| | | | | 318/615 |
| 2015/0251313 A1* | 9/2015 | Fujimoto | ............... | G05B 13/02 |
| | | | | 700/245 |
| 2021/0216048 A1* | 7/2021 | Nishida | .................. | H02P 23/04 |

* cited by examiner

CONTROL SYSTEM, CONTROL METHOD, AND CONTROL PROGRAM

CROSS REFERENCE TO RELATED APPLICATIONS

This application is based upon and claims the benefit of priority from Japanese patent application No. 2018-197807, filed on Oct. 19, 2018, the disclosure of which is incorporated herein in its entirety by reference.

BACKGROUND

The present disclosure relates to a control system, a control method, and a control program.

In recent years, servomotors have been used for joint parts of robot arms in order to, for example, precisely drive links that constitute the robot arms. It should be noted that since a load member driven by a motor, such as a link, is connected to the motor through a member having low rigidity such as a gear (a speed reducer), resonance occurs due to the inertia (the moment of inertia) of the motor and the load member.

Chowarit Mitsantisuk, Manuel Nandayapa, Kiyoshi Ohishi and Seiichiro Katsura: "Design for Sensorless Force Control of Flexible Robot by Using Resonance Ratio Control Based on Coefficient Diagram Method", AUTOMATIKA Journal for Control, Measurement, Electronics, Computing and Communications, Vol. 54, No. 1, pp. 62-73 (2013) (hereinafter referred to as Non-patent Literature 1) discloses a method for controlling a motor by resonance-ratio control. In Non-patent Literature 1, a filter that converts a disturbance on a load side estimated by a disturbance observer into an input torque is used.

SUMMARY

The inventors have found the following problem regarding the control system.

In the control method disclosed in Non-patent Literature 1, the filter that converts a disturbance on the load side estimated by the disturbance observer into an input torque is used. This filter is used on the precondition that the resonance-ratio control is used. In particular, this filter is used to take the effect of the input torque on the resonance-ratio control into consideration. Therefore, there is a problem that the filter disclosed in Non-patent Literature 1 is not versatile. Further, the order of the numerators of this filter is higher than the order of the denominators thereof and hence it is improper. Therefore, there is another problem that the implementation of the filter is complicated.

The present disclosure has been made in view of the above-described circumstances and provides a control system, a control method, and a control program that have high versatility and can be easily implemented.

A first exemplary aspect is a control system including: driving means for driving a load member; a first sensor configured to detect information about the driving by the driving means or information about a relation between the driving means and the load member as first sensor information; a second sensor configured to detect information about a displacement of the load member as second sensor information; and a control unit configured to perform feedback control of the driving means so as to follow a command value in a two-inertial system model including an inertial system on a load side and an inertial system on a driving side, in which the control unit includes: a disturbance observer configured to estimate a disturbance caused in the load member based on the first and second sensor information; and a filter configured to convert an estimated value of the disturbance into a driving force of the driving means, in which: when the filter is expressed by a transfer function, the order of a numerator of the filter is equal to the order of a denominator thereof; and the numerator includes inertia on the driving side and the denominator includes inertia on the load side.

In the above-described control system, the denominator of the filter may include a coefficient of viscous friction on the load side and the numerator thereof may include a coefficient of viscous friction on the driving side. Further, each of the numerator and denominator of the filter may include a first-order differentiation of the estimated value of the disturbance.

The filter may convert the estimated value into a torque of the driving means, and the control unit may perform the feedback control so as to follow a torque command value or perform control to change a control amount of a controller according to the estimated value of the disturbance so that a task is accomplished.

Another exemplary aspect is a control method for a control system, the control system including: driving means for driving a load member; a first sensor configured to detect information about the driving by the driving means or information about a relation between the driving means and the load member as first sensor information; and a second sensor configured to detect information about a displacement of the load member as second sensor information, the control method being for performing feedback control of the driving means so as to follow a command value in a two-inertial system model including an inertial system on a load side and an inertial system on a driving side, the control method including: estimating a disturbance caused in the load member based on the first and second sensor information; and converting an estimated value of the disturbance into a driving force of the driving means by using a filter, in which: when the filter is expressed by a transfer function, the order of a numerator of the filter is equal to the order of a denominator thereof; and the numerator includes inertia on the driving side and the denominator includes inertia on the load side.

Another exemplary aspect is a control program for causing a computer to perform a control method in a control system, the control system including: driving means for driving a load member; a first sensor configured to detect information about the driving by the driving means or information about a relation between the driving means and the load member as first sensor information; and a second sensor configured to detect information about a displacement of the load member as second sensor information, the control method being for performing feedback control of the driving means so as to follow a command value in a two-inertial system model including an inertial system on a load side and an inertial system on a driving side, the control method including: estimating a disturbance caused in the load member based on the first and second sensor information; and converting an estimated value of the disturbance into a driving force of the driving means by using a filter, in which: when the filter is expressed by a transfer function, the order of a numerator of the filter is equal to the order of a denominator thereof; and the numerator includes inertia on the driving side and the denominator includes inertia on the load side.

According to the present disclosure, it is possible to provide a control system, a control method, and a control program that have high versatility and can be easily implemented.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, the following descriptions and drawings are simplified as appropriate for clarifying the explanation.

Firstly, a control system according to an embodiment is described with reference to FIG. 1. The control system according to this embodiment is, for example, a control system for controlling driving of each joint part of a robot, such as a wrist joint, an elbow joint, a shoulder joint, an ankle joint part, a knee joint part, a hip joint part, etc.

Figure 1:
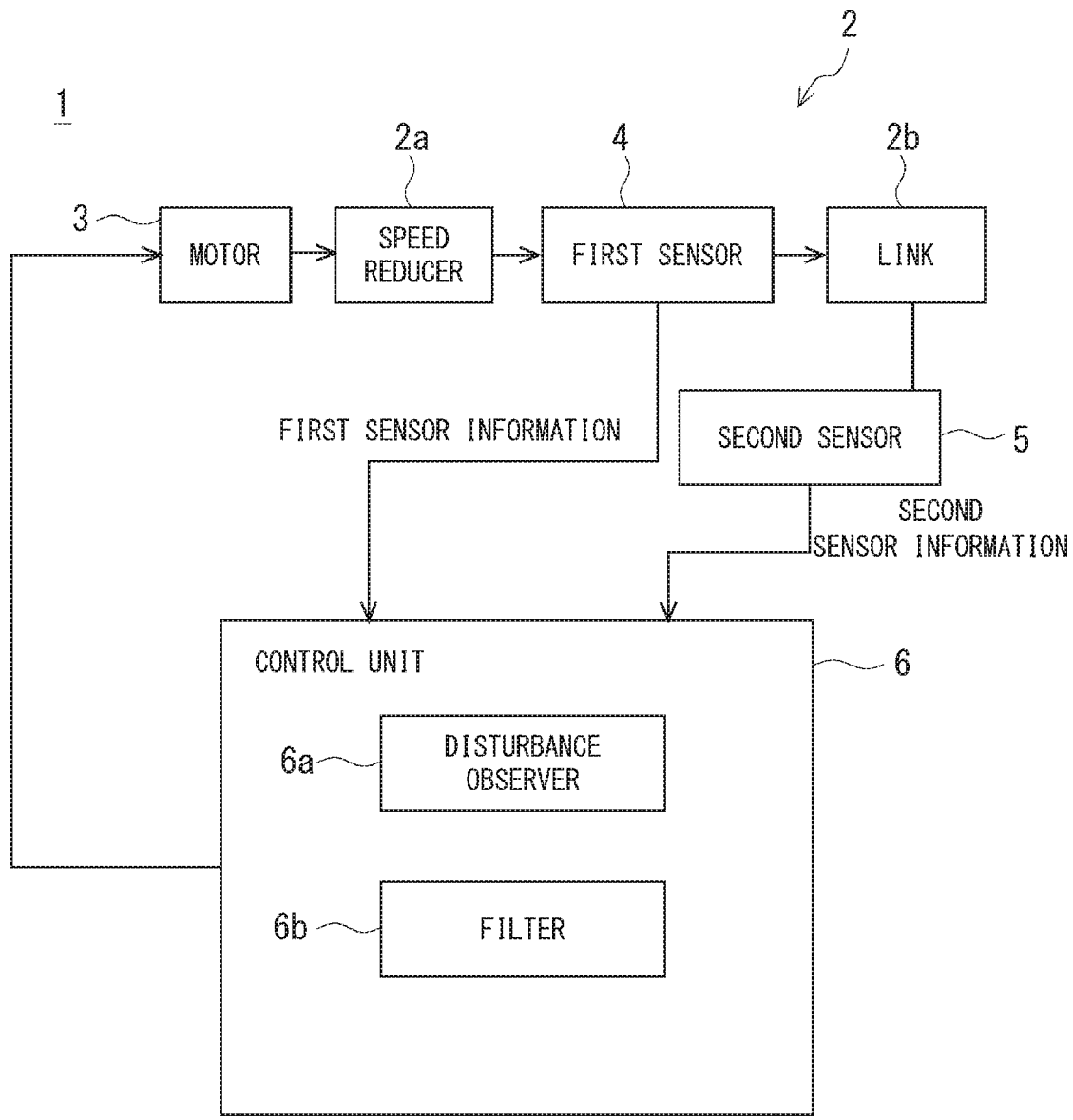
FIG. 1 is a block diagram showing a control system according to an embodiment.

FIG. 1 is a block diagram showing the control system. The control system 1 according to this embodiment includes a motor 3 that drives a link 2b, a first sensor 4, a second sensor 5, and a control unit 6 that controls the motor 3.

The motor 3 is a specific example of driving means for driving a joint part 2, which is an object to be controlled. For example, the motor 3 is an AC (Alternating Current) servomotor. The motor 3 is driven based on a control signal output from the control unit 6. The control signal is, for example, a PWM (Pulse Width Modulation) signal. The motor 3 is disposed in the joint part 2 and rotationally drives the joint part 2. Alternatively, the motor 3 may be a linear motor. The joint part 2 includes a speed reducer 2a, a link 2b, etc. The link 2b, which is a load member, is connected to the motor 3 through the speed reducer 2a. The speed reducer 2a is disposed between a motor shaft of the motor 3 and an output shaft fixed to the link 2b of the joint part 2.

The first sensor 4 detects information about a relation between the driving means and the load member as first sensor information. The information about the relation between the driving means and the load member is information about a driving force, such as a torque, of the joint part 2. The first sensor 4 is a torque sensor and detects a joint torque $T_S$ (which will be described later) as the first sensor information. The first sensor 4 is disposed between the link 2b and the speed reducer 2a, and detects a shaft torque generated between the motor 3 and the link 2b. Note that when the motor 3 is a linear motor, the information about the driving of the motor 3 is information about a force in a rectilinear direction.

Figure 2:
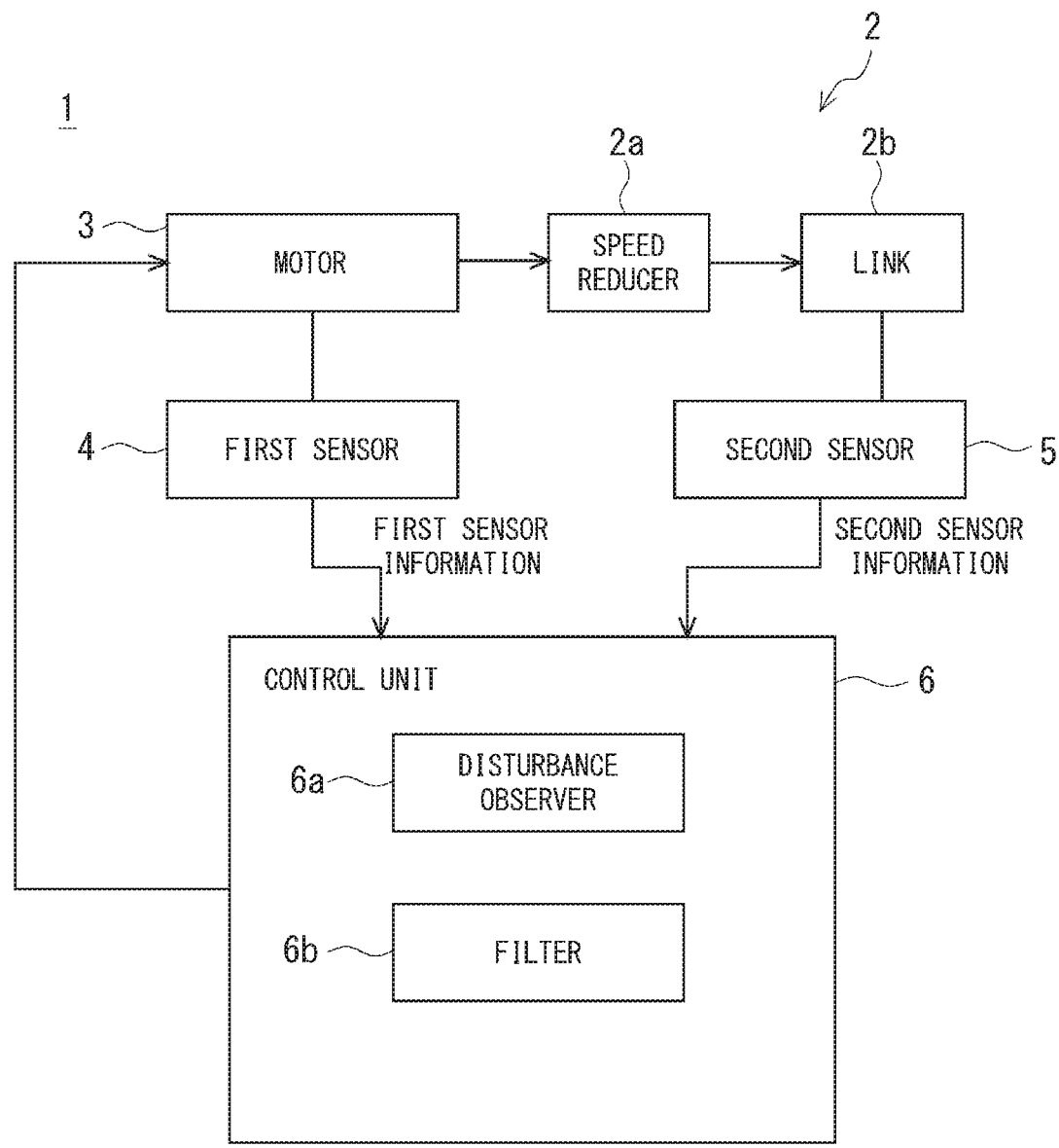
FIG. 2 is a block diagram showing a control system in which a first sensor 4 is disposed in a different position.

Alternatively, as shown in FIG. 2, the first sensor 4 may detect information about a driving amount of the motor 3. The information about the driving amount of the motor 3 may be, for example, a rotational angle, an angular speed, or an angular acceleration of the motor 3. When the first sensor 4 is an encoder of the motor 3, the first sensor 4 detects an angle of the motor 3 as the first sensor information. Further, an angular speed can be calculated by differentiating the angle with respect to the time. Note that when the motor 3 is a linear motor, the information about the driving amount of the motor 3 is information about a position, a speed, or an acceleration in the rectilinear direction. As described above, the first sensor 4 detects information about the driving amount of the driving means (the motor 3) or information about the relation between the driving means (the motor 3) and the load member (the link 2b) as the first sensor information.

The second sensor 5 is disposed on the link 2b side of the speed reducer 2a. The second sensor 5 detects information about a displacement of the link 2b as second sensor information. The information about the displacement of the link 2b may be, for example, information about a rotational angle (a rotational position), a rectilinear position, an angular speed, or an angular acceleration of the link 2b. When the second sensor 5 is an encoder on the load side, the second sensor 5 detects an angle of the link 2b as the second sensor information. Further, an angular speed can be calculated by differentiating the angle with respect to the time. The second sensor 5 is disposed on the link 2b side of the speed reducer 2a. Note that the second sensor 5 is not limited to the encoder and may be formed by a potentiometer or the like.

Note that in this embodiment, the joint part 2 is applied to a rotational joint part. However, the application of the joint part is not limited this example. That is, the joint part may be applied to an arbitral movable part of a robot, such as to a translationally movable member that can be translationally moved.

In the following description, since the motor 3 is a rotational motor, the driving amount of the motor 3 and the displacement of the link 2b are described as angles. However, when the motor 3 is a linear motor, the driving amount and the displacement are positions or distances along a rectilinear-motion direction. That is, the driving amount of the motor 3 and the displacement of the link 2b mean angles, positions, or distances. Similarly, a driving speed of the motor 3, which is obtained by differentiating the driving amount of the motor 3 with respect to the time, and a displacement speed of the link 2b, which is obtained by differentiating the displacement of the link 2b with respect to the time, are described as angular speeds. However, when the motor 3 is a linear motor, the driving speed and the displacement speed are speeds along the rectilinear-motion direction. That is, the speed corresponds to the time derivative (the amount of change over time) of the driving amount or the displacement and means an angular speed or a speed. In other words, when the driving amount or the displacement is expressed by an angle, the driving speed or the displacement speed, which is its time derivative, is an angular speed. Further, when the driving amount or the displacement is expressed by a distance, the driving speed or the displacement speed, which is its time derivative, is a speed. Since the motor 3 is a rotational motor, the driving force of the motor 3 and the disturbance and the like in the link 2b are described as torques. However, when the motor 3 is a linear motor, the driving force of the motor 3 and the disturbance in the link 2b are forces along the rectilinear-motion direction.

The control unit 6 performs the so-called feedback control in which the control unit 6 rotationally drives the motor 3 based on the first and second sensor information output from the first and second sensors 4 and 5. Note that the control unit 6 is formed by, for example, hardware mainly using a microcomputer including: a CPU (Central Processing Unit) that performs arithmetic processing, control processing, etc.; a memory including a ROM (Read Only Memory) and a RAM (Random Access Memory) in which arithmetic programs, control programs, etc. executed by the CPU are stored; an interface unit (I/F) that externally receives and outputs signals, and so on. The CPU, the memory, and the interface unit are connected with each other through a data bus or the like. As the control unit 6 executes the control program, a control method described below is performed.

When the link 2b and the motor 3 are connected through the speed reducer 2a having high elasticity, resonance occurs due to the inertia (the moment of inertia) of the motor 3 and the load (the link 2b). In particular, in the case of a humanoid robot, an industrial robot, or the like, a harmonic gear or the like is used in the joint part 2. Therefore, there is a problem that its viscous friction becomes larger. In regards to this matter, in this embodiment, a two-inertial system model in which the control unit 6 is modeled in two inertial systems, i.e., in an inertial system on the load side and that on the driving side is used. The two inertial systems can be regarded as a system in which the motor is connected with the load through an elastic body (such as a speed reducer). Note that a reduction ratio R of the speed reducer 2a may be 1. That is, this embodiment can also be applied to a control system in which the speed is not reduced but an elastic element is used.

Each of the motor 3 side and the load side (the link 2b side) is an inertial system in which there is inertia. Further, the speed reducer 2a located between the motor 3 and the link 2b is an elastic element (a spring element). Since the speed reducer 2a is a non-rigid body and includes the spring element, resonance occurs in the joint part 2. Therefore, in this embodiment, the joint part 2 is modeled as two inertial systems and a disturbance observer 6a that estimates a disturbance on the load side (hereinafter also referred to as the load-side disturbance) is introduced. Meanwhile, the feed-back destination of the feedback control of the estimated disturbance torque on the load side is the motor torque. The motor torque is physically different from the load-side torque. Therefore, it is necessary to convert the estimated load-side torque into a motor torque before it is fed back to the motor torque. Accordingly, the control unit 6 includes a disturbance observer 6a that estimates the load-side disturbance and a filter 6b that converts the estimated disturbance into the motor torque.

Figure 3:
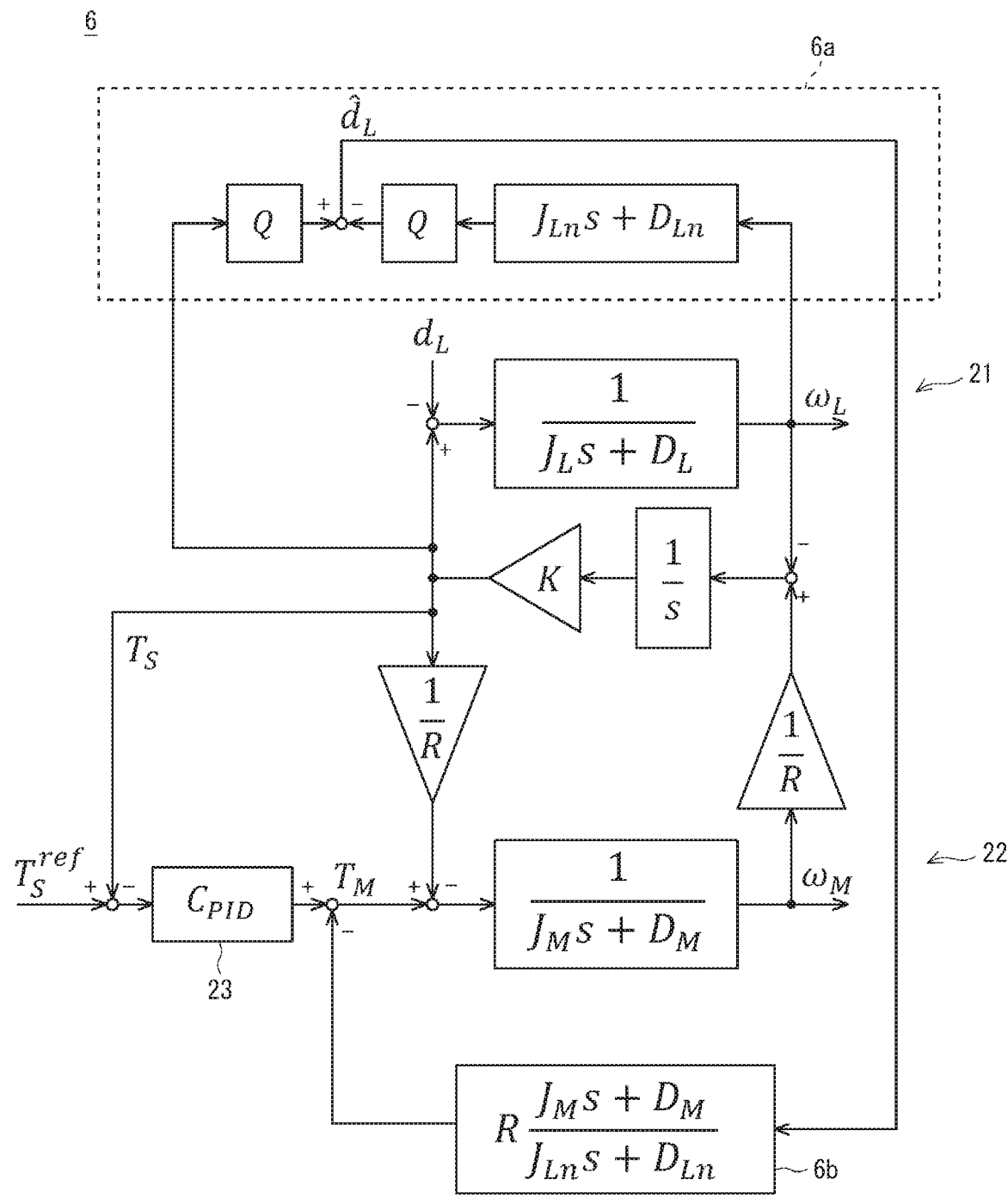
FIG. 3 is a block diagram of a control system according to an embodiment.

Control performed by the control unit 6 is described with reference to FIG. 3. FIG. 3 is a control block diagram of the control unit 6. A control system of the control unit 6 includes an inertial system 21 on the load side and an inertial system 22 on the driving side. There is rigidity K of the speed reducer 2a between the inertial system 21 on the load side and the inertial system 22 on the driving side. The disturbance observer 6a is disposed in the inertial system 21 on the load side. The filter 6b and a PID controller 23 are disposed in the inertial system 22 on the driving side.

Symbols in this embodiment are as follows.
$J_M$: Motor inertia
$J_L$: Load inertia
$J_{Ln}$: Nominal load inertia Typical value used in design of control system (nominal value)
$D_M$: Coefficient of viscous friction of motor
$D_L$: Coefficient of viscous friction of load
$D_{Ln}$: Nominal coefficient of viscous friction of load Typical value used in design of control system (nominal value)
$\omega_M$: Angular speed of motor (driving speed)
$\omega_L$: Angular speed on load side (displacement speed)
$\theta_M$: Motor angle (displacement)
$\theta_L$: Load-side Angle (displacement)
s: Operator indicating differentiation
1/s: Operator indicating integration
R: Reduction ratio
$T_S$: Joint torque (sensor value)
$T_S^{ref}$: Command value of joint torque
$T_M$: Motor torque (driving torque)
K: Rigidity of speed reducer 2a
Q, Q(s): Filter for forming disturbance observer (typically, low-pass filter)
$d_L$: Load-side disturbance torque
[Expression 1]
$\hat{d}_L$: Estimated load-side disturbance torque, $\hat{d}_L$ is also expressed as estimated value $d_L$(hat) hereinafter
$G_{\theta_M T_M}$: Transfer function from motor torque to motor angle
$G_{\theta_L T_M}$: Transfer function from motor torque to load-side angle
$G_{\theta_L d_L}$: Transfer function from load-side disturbance torque to load-side angle
$G_{\theta_M d_L}$: Transfer function from load-side disturbance torque to motor angle
$G_{T_S T_M}$: Transfer function from motor torque to joint torque
$G_{T_S d_L}$: Transfer function from load-side disturbance torque to joint torque
$G_{T_M d_L}$: Transfer function from load-side disturbance torque to motor torque (filter)

Note that $G_{AB}$ represents a transfer function from B to A. In the following description, subscripts of transfer functions (i.e., A and B in $G_{AB}$) are expressed in a simplified manner for the sake of convenience. For example, a transfer function from a motor torque to a motor angle is expressed as $G_{\theta M T M}$. Other transfer functions are also expressed in a similar manner.

The disturbance observer 6a estimates a disturbance caused on the load side. The disturbance on the load side is caused as the link 2b comes into contact with other objects or the like. For example, the disturbance observer 6a estimates a disturbance that is caused by an external force received by an end effector disposed at the tip of the link 2b. The disturbance observer 6a calculates an estimated value $d_L$(hat) from a load-side angular speed $\omega_L$ and a joint torque $T_S$ by using a filter Q. The filter Q is, for example, a low-pass filter.

The estimated value $d_L$(hat) estimated by the disturbance observer 6a is input to the filter 6b. The filter 6b converts the estimated value $d_L$(hat) into a motor torque. That is, the filter 6b converts the estimated value $d_L$(hat) into a driving force of the motor. A difference between a command value $T_S^{ref}$ of the joint torque and a joint torque $T_S$ detected by the first sensor 4 is input to the PID controller 23. A PID parameter(s) for performing appropriate PID control is set in the PID controller 23. Therefore, the control unit 6 can perform feedback control so as to follow the command value $T_S^{ref}$ for the joint torque. A difference between an output of the PID controller 23 and an output of the filter 6b is output as a motor torque $T_M$ and input to the motor 3. That is, the control unit 6 performs feedback control so as to compensate for the disturbance torque based on the output of the filter 6b.

Derivation of the filter 6b is described hereinafter. Equations of motions of the two inertial systems are expressed as shown in the below-shown Expressions (1) and (2), respectively. The joint torque $T_S$ (a torsional torque) is caused by elasticity of the speed reducer 2a (a torsion of the speed reducer 2a). As shown in the Expression (3), it is assumed that the joint torque $T_S$ changes linearly with respect to the difference between the angles (i.e., between the motor angle $\theta_M$ and the load-side angle $\theta_L$).

[Expression 2]

$$(J_M s^2 + D_M s)\theta_M = T_M - \frac{1}{R} T_S \quad (1)$$

$$(J_L s^2 + D_L s)\theta_L = T_S - d_L \quad (2)$$

$$T_S = K\left(\frac{1}{R}\theta_M - \theta_L\right) \quad (3)$$

From these equations, the transfer functions can be calculated as shown in the below-shown Expressions (4) to (8), respectively.

[Expression 3]

$$G_{\theta_M T_M} = \frac{J_L s^2 + D_L s + K}{D(s)} \quad (4)$$

$$G_{\theta_L T_M} = \frac{1}{R}\frac{K}{D(s)} \quad (5)$$

$$G_{\theta_M d_L} = -\frac{1}{R}\frac{K}{D(s)} \quad (6)$$

$$G_{\theta_L d_L} = -\frac{J_M s^2 + D_M s + \frac{K}{R^2}}{D(s)} \quad (7)$$

$$D(s) = J_M J_L s^4 + (J_L D_M + J_M D_L)s^3 + \left(KJ_M + \frac{K}{R^2}J_L + D_M D_L\right)s^2 + \left(KD_M + \frac{K}{R^2}D_L\right)s \quad (8)$$

The transfer function $G_{T_S T_M}$ from the motor torque $T_M$ to the joint torque $T_S$ is expressed as shown in the Expression (9).

[Expression 4]

$$G_{T_S T_M} = \frac{K}{R} G_{\theta_M T_M} - K G_{\theta_L T_M} \quad (9)$$

$$= \frac{K}{R} \frac{J_L s^2 + D_L s}{D(s)}$$

The first line of the Expression (9) is derived from the Expression (3) and the second line thereof is derived from the Expressions (4) and (5). Similarly, the transfer function GTSdL from the load-side disturbance torque $d_L$ to the joint torque $T_S$ is expressed as shown in the Expression (10).

[Expression 5]

$$G_{T_S d_L} = \frac{K}{R} G_{\theta_M d_L} - K G_{\theta_L d_L} \quad (10)$$

$$= K\frac{J_M s^2 + D_M s}{D(s)}$$

The joint torque $T_S$, in which a plurality of inputs, i.e., the input on the motor side (the motor torque) and the input on the load side (the load-side disturbance torque) are taken into consideration, is expressed as shown in the Expression (11).

[Expression 6]

$$T_S = G_{T_S T_M} T_M + G_{T_S d_L} d_L \quad (11)$$

The transfer function $G_{TMdL}$ is defined as an appropriate filter. As shown in FIG. 3, a load-side disturbance torque $d_L$ is added on the load side and hence the control unit 6 adds an estimated value $d_L$(hat) of the load-side disturbance torque to the input signal through the filter 6b. As a result, the joint torque $T_S$ is expressed as shown in the Expression (12). In the expression, $T_{M0}$ is an original input torque (a driving torque).

[Expression 7]

$$T_S = G_{T_S T_M}\left(T_{M0} - G_{T_M d_L}\hat{d}_L\right) + G_{T_S d_L} d_L \quad (12)$$

$$= G_{T_S T_M} T_{M0} - G_{T_S T_M} G_{T_M d_L}\hat{d}_L + G_{T_S d_L} d_L$$

If the load-side disturbance torque $d_L$ and the estimated value $d_L$(hat) have been canceled out each other, it is considered that the compensation for the disturbance has succeeded. If the load-side disturbance torque is correctly estimated, the load-side disturbance torque $d_L$ becomes equal to the estimated value $d_L$(hat). Therefore, considering that $d_L$ is equal to $d_L$(hat) (i.e., $\hat{d}_L = d_L$) in the Expression (12), the terms of $d_L$ and $d_L$(hat) are expressed as shown in the Expression (13).

[Expression 8]

$$(-G_{T_S T_M} G_{T_M d_L} + G_{T_S d_L})d_L = 0 \quad (13)$$

Therefore, the filter $G_{TMDL}$ is expressed as shown in the Expression (14).

[Expression 9]

$$G_{T_M d_L} = G_{T_S T_M}^{-1} G_{T_S d_L} \quad (14)$$

$$= \frac{RD(s)}{K(J_L s^2 + D_L s)} \frac{K(J_M s^2 + D_M s)}{D(s)}$$

$$= R\frac{J_M s + D_M}{J_L s + D_L}$$

The transfer function $G_{TMdL}$ becomes the filter 6b that converts the estimated value into the motor torque. As described above, it is possible to obtain the filter 6b that compensates for the effect on the joint torque based on the estimated value $d_L$(hat) of the load-side disturbance in the two inertial systems. The disturbance observer of the control unit 6 estimates the disturbance caused in the load member based on the first and second sensor information. Then, the control unit 6 converts the estimated value of the disturbance into a driving force of the driving means by using the filter 6b in which: when the filter 6b is expressed by a transfer function, the order of the estimated value of the disturbance in the numerator is equal to that of the denominator; and the numerator includes inertia on the driving side and the denominator includes inertia (a nominal value) on the load side.

Non-patent Literature 1 uses the filter in which, among the effects caused in the load side, the effect of the feedback torque used in the resonance-ratio control is taken into consideration. In contrast to this, in this embodiment, the filter 6b that is used to take, among the effects caused by the load-side disturbance, the effect on the shaft torque into consideration is used. The filter 6b converts the estimated value of the disturbance torque on the load side into a torque of the motor. Therefore, the filter 6b is versatile. That is, since the filter 6b is a filter that is used irrespective of whether the resonance-ratio control is performed or not, the filter 6b is versatile.

Further, since the order of the denominators of the filter 6b is equal to the order of the numerators thereof (i.e., since it is proper), the controller can be easily implemented. That is, since the order for the estimated value $d_L$(hat) is the first order (the first-order differentiation) and hence is the same order in the filter 6b, the implementation can be improved. Therefore, it is possible to easily perform appropriate feedback control. It is possible to provide a control system and a control method that have high versatility and can be easily implemented.

Note that the numerator of the filter 6b includes a viscous-friction coefficient $D_M$ on the driving side and the denominator thereof includes a viscous-friction coefficient $D_{Ln}$ (a nominal value) on the load side. However, it is possible to make one or both of the viscous-friction coefficients $D_M$ and $D_{Ln}$ zero.

Note that in this embodiment, a torque sensor value (an output of K) is used in the disturbance observer 6a. That is, the joint torque $T_S$ output from the first sensor 4, which is the torque sensor, is used. However, a motor encoder may be used as the first sensor 4 and a value of the encoder may be used. For example, it is possible to calculate a shaft torsional torque by multiplying a difference between two values of the encoders, which is calculated while taking the reduction ratio into consideration, by the rigidity of the spring element. Then, it is possible to use the calculated shaft torsional torque in the disturbance observer 6a.

In the embodiment, the control unit 6 performs torque control so the target torque follows the load-side torque. However, the use of the output of the filter 6b is not limited to this example. For example, it is possible to improve disturbance suppression performance in position control by the estimated torque value. For example, the control unit 6 performs control to change the control amount of the controller according to the estimated value $d_L$(hat) of the disturbance so that a task is accomplished. In addition to the torque control, the filter 6b can also be applied to flexible control for releasing a force, such as impedance control.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

Note that the present disclosure is not to be limited to the above-described embodiments and they can be modified as appropriate without departing from the scope and spirit of the present disclosure. For example, the driving means for driving a load member is not limited to the electric motor. That is, the driving means may be a pressure motor such as a hydraulic motor and a water-pressure motor, or may be other types of actuators.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system comprising:
   driving means configured to drive a load member;
   a first sensor configured to detect information about the driving by the driving means or information about a relation between the driving means and the load member as first sensor information;
   a second sensor configured to detect information about a displacement of the load member as second sensor information; and
   a control unit configured to perform feedback control of the driving means so as to follow a command value in a two-inertial system model including an inertial system on a load side and an inertial system on a driving side, wherein
   the control unit comprises:
   a disturbance observer configured to estimate a disturbance caused in the load member based on the first and second sensor information; and
   a filter configured to convert an estimated value of the disturbance into a driving force of the driving means, in which: when the filter is expressed by a transfer function, an order of a numerator of the filter is equal to an order of a denominator thereof; and the numerator includes inertia on the driving side and the denominator includes inertia on the load side.

2. The control system according to claim 1, wherein
   the denominator of the filter includes a coefficient of viscous friction on the load side and the numerator thereof includes a coefficient of viscous friction on the driving side, and
   each of the numerator and denominator of the filter includes a first-order differentiation.

3. The control system according to claim 1, wherein
   the filter converts the estimated value into a torque of the driving means, and
   the control unit performs the feedback control so as to follow a torque command value or perform control to change a control amount of a controller according to the estimated value of the disturbance so that a task is accomplished.

4. A control method for a control system,
   the control system comprising:
   driving means configured to drive a load member;
   a first sensor configured to detect information about the driving by the driving means or information about a relation between the driving means and the load member as first sensor information; and
   a second sensor configured to detect information about a displacement of the load member as second sensor information,
   the control method being for performing feedback control of the driving means so as to follow a command value in a two-inertial system model including an inertial system on a load side and an inertial system on a driving side, the control method comprising:

estimating a disturbance caused in the load member based on the first and second sensor information; and converting an estimated value of the disturbance into a driving force of the driving means by using a filter, in which: when the filter is expressed by a transfer function, an order of a numerator of the filter is equal to an order of a denominator thereof; and the numerator includes inertia on the driving side and the denominator includes inertia on the load side.

5. A non-transitory computer readable medium storing a control program for causing a computer to perform a control method in a control system, the control system comprising:

driving means configured to drive a load member;

a first sensor configured to detect information about the driving by the driving means or information about a relation between the driving means and the load member as first sensor information; and a second sensor configured to detect information about a displacement of the load member as second sensor information, the control method being for performing feedback control of the driving means so as to follow a command value in a two-inertial system model including an inertial system on a load side and an inertial system on a driving side, the control method comprising:

estimating a disturbance caused in the load member based on the first and second sensor information; and converting an estimated value of the disturbance into a driving force of the driving means by using a filter, in which: when the filter is expressed by a transfer function, an order of a numerator of the filter is equal to an order of a denominator thereof; and the numerator includes inertia on the driving side and the denominator includes inertia on the load side.

\* \* \* \* \*